United States Patent
Iny (10) Patent No.: US 7,525,995 B2
(45) Date of Patent: *Apr. 28, 2009

(54) METHOD AND SYSTEM FOR SWITCHING PACKETS

(75) Inventor: Ofer Iny, Woodland Hills, CA (US)

(73) Assignee: Dune Networks Inc., Sunnyvale, CA (US)

( * ) Notice: Subject to any disclaimer, the term of this patent is extended or adjusted under 35 U.S.C. 154(b) by 764 days.

This patent is subject to a terminal disclaimer.

(21) Appl. No.: 11/099,582

(22) Filed: Apr. 6, 2005

(65) Prior Publication Data

US 2005/0174940 A1     Aug. 11, 2005

Related U.S. Application Data

(63) Continuation of application No. 09/867,506, filed on May 30, 2001, now Pat. No. 7,095,744.

(60) Provisional application No. 60/252,470, filed on Nov. 22, 2000.

(51) Int. Cl.
    *H04J 3/24*    (2006.01)
(52) U.S. Cl. .................. 370/474; 370/386
(58) Field of Classification Search .......... 370/386, 370/389, 392, 394, 465, 473, 474, 388
    See application file for complete search history.

(56) References Cited

U.S. PATENT DOCUMENTS

| | | | |
|---|---|---|---|
| 4,375,097 A | 2/1983 | Ulug | |
| 5,050,166 A | 9/1991 | Cantoni et al. | |
| 5,282,203 A | * 1/1994 | Oouchi | ............ 370/232 |
| 5,313,582 A | 5/1994 | Hendel | |

(Continued)

*Primary Examiner*—Firmin Backer
*Assistant Examiner*—Christine Ng
(74) *Attorney, Agent, or Firm*—Leason Ellis LLP (57) ABSTRACT

A system for switching variable size packets in a network is disclosed. The system comprises at least one ingress controller which receives a plurality of packets and which segments each of the packets into fixed sized fragments. The at least one ingress controller has a time-clock. The time clocks of all ingress controllers are synchronized to within a tolerance. Each fragment is tagged with at least a unique source of ID, time-stamp, and a fragment-number to form a cell. Each cell belongs to one packet having the same time-stamp value. The ingress controller sends each of the cells through a link such that a cell's destination is reachable through that link. The system includes a fabric element which receives cells from a plurality of inputs links. The cells are ordered. The fabric element sends ordered cells through a plurality of outputs and through which the destination of the cells is reachable. The cell order is defined such that a cell ahead of another either has a lagging time stamp, or if the timestamp is the same the cell ahead of another has a source-id which has a predetermined priority, or if both the timestamp and the source-id are the same the cell ahead of another has a lagging fragment-number. The system finally includes at least one egress controller which receives the ordered cells from the plurality of input links, and sends the ordered cells through an output where such order results in complete packets. A packet switching device in accordance with the present invention solves the cell ordering and packet reassembly issues using a unified distributed method in a multi-stage interconnect network.

24 Claims, 5 Drawing Sheets

U.S. PATENT DOCUMENTS

| | | |
|---|---|---|
| 5,367,643 A | 11/1994 | Chang |
| 5,383,182 A | 1/1995 | Therasse et al. |
| 5,463,622 A | 10/1995 | Keller |
| 5,563,879 A | 10/1996 | Sanders et al. |
| 5,602,995 A | 2/1997 | Hendel |
| 5,634,015 A | 5/1997 | Chang |
| 5,640,399 A | 6/1997 | Rostoker |
| 5,784,357 A * | 7/1998 | Wolker et al. .............. 370/218 |
| 5,802,051 A | 9/1998 | Peterson et al. |
| 5,802,052 A | 9/1998 | Venkataraman |
| 5,802,287 A | 9/1998 | Rostoker |
| 6,052,386 A | 4/2000 | Achilleoudis et al. |
| 6,081,507 A | 6/2000 | Chao |
| 6,104,696 A | 8/2000 | Kadambi |
| 6,115,390 A * | 9/2000 | Chuah ....................... 370/443 |
| 6,154,446 A | 11/2000 | Kadambi |
| 6,175,902 B1 | 1/2001 | Runaldue |
| 6,310,893 B1 | 10/2001 | Yuan et al. |
| 6,345,056 B1 | 2/2002 | Bharucha et al. |
| 6,721,271 B1 | 4/2004 | Beshai et al. |
| 6,721,326 B1 | 4/2004 | Shibata |
| 6,839,339 B1 * | 1/2005 | Chuah ....................... 370/349 |
| 6,912,222 B1 * | 6/2005 | Wheeler et al. ........ 370/395.31 |
| 7,065,779 B1 * | 6/2006 | Crocker et al. .............. 725/111 |
| 7,095,744 B2 * | 8/2006 | Iny ........................ 370/395.6 |

\* cited by examiner

METHOD AND SYSTEM FOR SWITCHING PACKETS

CROSS-REFERENCE TO RELATED APPLICATION

This application is a continuation of U.S. patent application Ser. No. 09/867,506, filed May 30, 2001, now U.S. Pat. No. 7,095,744 which claims priority from U.S. Provisional Patent Application, 60/252,470, filed Nov. 22, 2000.

FIELD OF THE INVENTION

The present invention relates generally to a variable size data packet switching device and more particularly to a system for switching variable size packets in a network.

BACKGROUND OF THE INVENTION

Modern data networks rely on a variable size packet transport network to interconnect the various network elements. Packet switching devices are required to route a packet through a network from a source to a destination. Typically a switching device has a plurality of ports. Data packets arrive through one of the ports and are routed out one or a plurality of ports.

A switching device, having a plurality of input and output ports, is required to support transporting variable sized packets from inputs to outputs while maintaining packet ordering within a flow. A flow is defined as a stream of packets arriving from one specific source to one destination. It is desirable that a switching device be scalable such that more inputs and outputs may be added, preferably while it is operating, while maintaining the same performance properties.

A scalable switching device can be separated into three parts: an ingress controller, an interconnect network, and an egress controller. Typically the ingress controller segments variable sized packets into fixed size cells. The cells are then routed through the interconnect network to the designated output. The egress controller then reassembles the cells into packets and reorders the packets to recover the ingress order.

A scalable interconnect network, referred to as a fabric, may be a multi-stage network where multiple paths exist from ingress to egress. In this case two categories of routing cells from input to output may be defined. Static Routing (SR) refers to a method where a path through the fabric is predetermined for each flow. Dynamic Routing (DR) refers to a method where cells of a flow may take different paths. The advantage of SR is that cells arrive at the output in order per flow. However, significant inefficiencies result from blocking, where one flow happens to select the same fabric link as another and by doing so oversubscribing the link capacity. Accordingly, dynamic routing (DR) is a preferred method for routing cells. DR greatly reduces the blocking problem. However, cells from a flow may arrive misordered and interleaved with cells from other flows.

The problem of misordering may be divided into two parts. First, flow cell reordering, and second whole packet reassembly and reordering. Typically, each problem was solved separately in dynamic routing fabrics.

Accordingly, what is needed is a system which solves these problems differently. The present invention addresses such a need.

SUMMARY OF THE INVENTION

A system for switching variable size packets in a network is disclosed. The system comprises at least one ingress controller which receives a plurality of packets and which segments each of the packets into fixed sized fragments. At least one ingress controller has a time-clock. All ingress controller's time-clocks are synchronized to within a tolerance. Each fragment is tagged with at least a unique source of ID, timestamp, and a fragment-number to form a cell. Each cell belonging to one packet has the same time-stamp value. The ingress controller sends each of the cells through a link such that a cell's destination is reachable through that link. The system includes a fabric element which receives cells from a plurality of inputs links. The cells are ordered. The fabric element sends the ordered cells through a plurality of outputs and through which a cell's destination is reachable. The cell order is defined such that a cell ahead of another either has a lagging time stamp, or if the timestamp is the same the cell ahead of another has a source-id which has a predetermined priority, or if both the timestamp and the source-id are the same the cell ahead of another has a lagging fragment-number. The system finally includes at least one egress controller which receives the ordered cells from the plurality of input links, and sends the ordered cells through an output where such order results in complete packets.

A packet switching device in accordance with the present invention solves the cell ordering and packet reassembly issues using a unified distributed method in a multi-stage interconnect network.

DETAILED DESCRIPTION

The present invention relates generally to a variable size data packet switching device and more particularly to a system for switching variable size packets in a network. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A method and system in accordance with the present invention, a multi-stage interconnect network (MIN), fabric, is built out of fabric elements connected in stages where each fabric element of a specific stage is connected to several fabric elements of the next stage. The MIN is used to connect ingress and egress controllers. The MIN has several routes from an ingress to egress. In a dynamic routing (DR) scheme, the ingress controller and the MIN routes cells to their indicted destination while attempting to balance the load on the available internal links. The Ingress controller constantly sends data cells on all output links. Data cells may have valid packet fragment, full, or may be empty. Other unrelated cells may be interleaved among the data cells through the same links.

Variable sized packets entering through the ingress controller are segmented into fixed size fragments. The fragments are tagged with a destination, timestamp, unique source-id, and a fragment-number to form a data cell. Data cells from same packet have the same timestamp. The ingress controller selects an output link for a cell such that the cell's indicated destination is reachable through the link while maintaining load balance over all possible links. When cells with packet fragments are not available for transmission on a link the ingress controller sends empty data cells, indicated by a cleared fragment valid flag with the current timestamp, and unique source-id. Data cells on all output links are always ordered.

Cell order is defined such that a cell ahead of another has a lagging timestamp, or if the timestamp is the same has a source-id which has a predetermined order, or, if both the timestamp and the source ids are the same, has a lagging fragment-number. Cell output order is a sequence of ordered cells where all cells are destined to the output and all cells of each packet destined to that output are present.

A fabric element (FE) has a FIFO per input link. An arriving data cell is buffered in its respective FIFO if the cell has a packet fragment, or if the FIFO occupancy is below a threshold and the cell is an empty data cell.

The fabric element sorts the oldest cells of all input FIFOs. The highest sorted cell is selected if all active inputs FIFOs have at least one cell. An active link is one through which a data cell was received during a past period (empty or full). The FE has a FIFO per output link. If the selected cell has a packet fragment it is placed in one such FIFO. The output FIFO is selected such that the cell's indicated destination is reachable through the link while maintaining load balance over all such links. When a data cell from an output FIFO is not available for transmission on a link the FE sends an empty data cell with the timestamp, source-id, and fragment-number of the last data cell that was selected from the sorter (full or empty). Thus, data cells on all output links are always ordered (with the exception of possible empty data cells with nonempty cells).

The egress controller has a FIFO per input link where arriving cells are buffered. The egress controller sorts the oldest cell in each FIFO. The highest sorted cell is selected for output if all active input FIFOs have at least one cell. If the selected data cell has a packet fragment it is placed in an outgoing buffer. As a result, cells in the output buffer are output ordered. That is, packets are fully reassembled and are ordered according to their chronological entry into the fabric.

Figure 1:
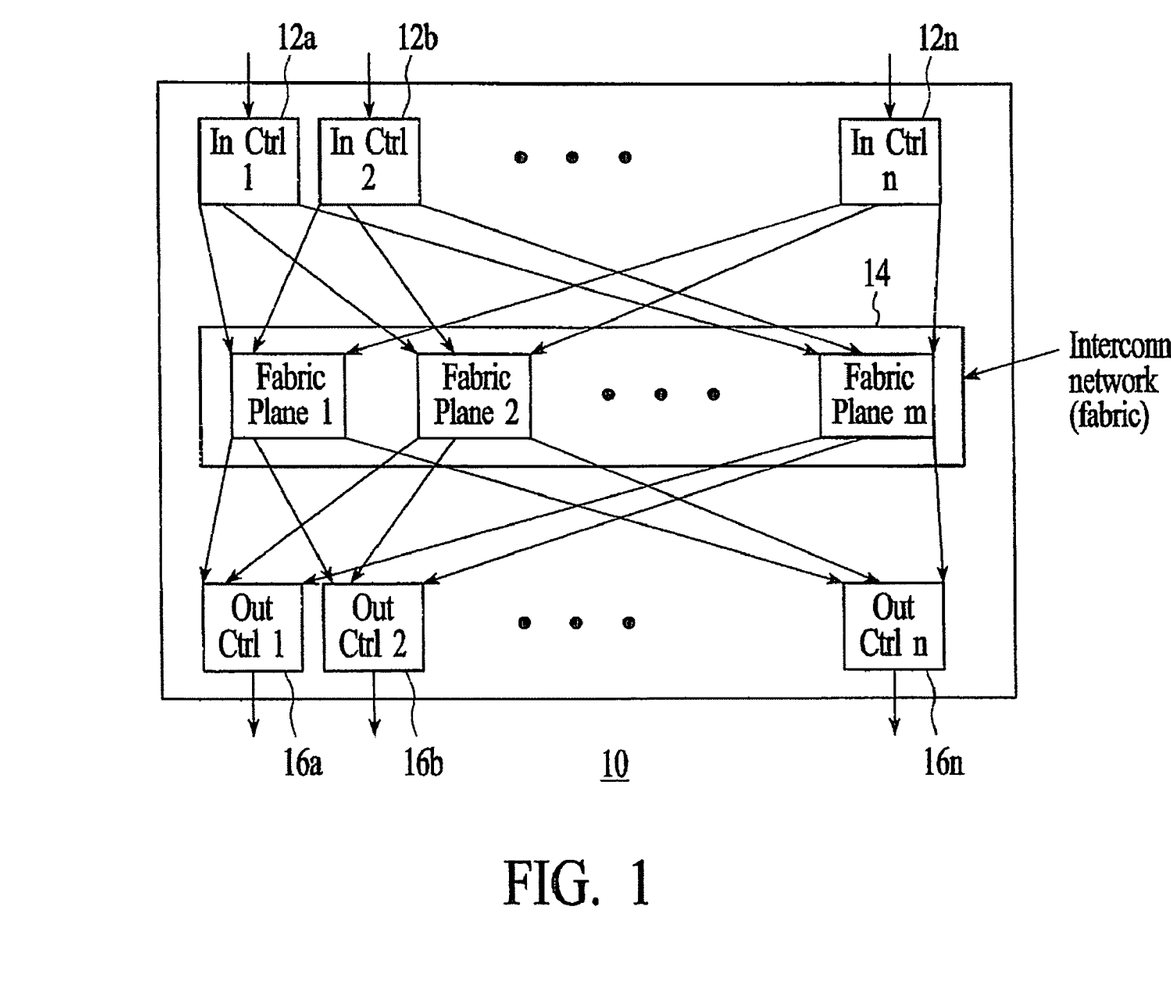
FIG. 1 is a block diagram of a packet switching device.

To describe the present invention in more detail, refer now to the following description in conjunction with the following figures. FIG. 1 is a block diagram of a packet switching device 10. Referring to FIG. 1, the packet switching device 10 has a number of ingress controllers (ICs) 12, an interconnect network 14, and a number of egress controllers (ECs) 16. The ICs 12 and ECs 16 have a number of independent links to the interconnecting network 14 such that the external port capacity can be supported. In one implementation there are 32 such links from each of the ICs 12 to the interconnect network 14 and from the interconnect network 14 to each of the OCs 16.

Figure 2:
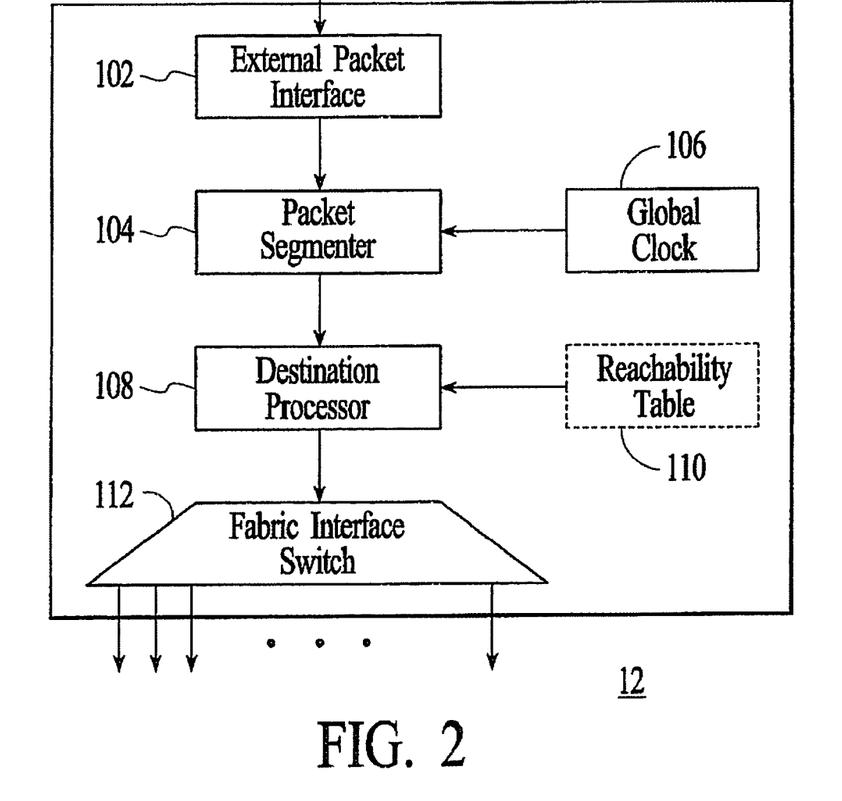
FIG. 2 is a block diagram of the ingress controller.

FIG. 2 is a block diagram of the ingress controller 12. Referring to FIG. 2, the ingress controller 12 has an external packet interface 102, a packet segmenter 104, a global clock 106, a destination processor 108, and a fabric interface switch 112. Complete packets arrive through the packet interface 102. The packet segmenter 104 breaks the packets into fragments, in one implementation this is a fixed 32-bytes fragment, and appends various tags to it to form a data cell. The segmenter 104 sends the data cells to the destination processor 108. The destination processor 108 sends each data cell to the fabric, through the fabric interface switch 112 and a fabric link, such that the cell's destination is reachable and all possible links are load balanced. One implementation has a reachability lookup table 110 where a cell's destination is looked up to get the possible output links. When there are no packet fragments, the ingress controller sends empty data cells with the timestamp set to equal the value of the global-time-clock 106 and source-id.

Figure 3:
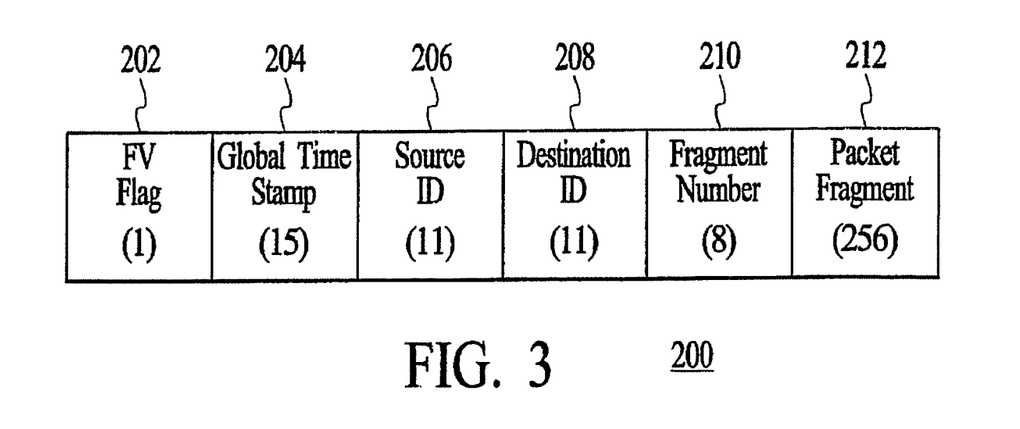
FIG. 3 is the format of a data cell from the ingress controller to the fabric, and from fabric element to fabric element, and from the fabric to the egress controller.

FIG. 3 is a preferred embodiment of the format of a data cell 200 from the ingress controller to the fabric, and from fabric element to fabric element, and from the fabric to the egress controller. Referring to FIG. 3, the cells from the ingress controller to the fabric elements have a Time Stamp 204, a Fragment-number 210, a Source-id 206, a Destination ID 208, and Fragment Valid (FV) flag 202. The FV flag 202 indicates if a packet fragment 212 is contained in the data cell If the FV flag 202 is set, then the time stamp 204 is a copy of the global-time-clock in the ingress controller at approximately the moment the first cell of the packet (cell with the first data fragment) was sent to the fabric interface switch. Thus, each cell belonging to same packet has the same time stamp. If the FV flag is clear 202, then the time stamp is the value of global-time-clock when the empty cell was sent. The fragment-number 210 indicates the location of the cell in the packet. In one implementation it is an incrementing number starting at zero for the start of packet cell. The Source-id 206 is a unique global number. The destination-id 208 indicates the destination output port of the packet. The destination-id is irrelevant when the cell is empty (FV flag clear).

Cells sent from the Ingress controller are always ordered on any one link. That means that a cell ahead of another one on a link has a lagging timestamp, or, if the timestamp is the same, a lagging fragment-number. In a pipelined implementation, the timestamp and fragment-number generation for both full and empty data cells must be consistent to result in this behavior.

Referring back to FIG. 1, in one implementation the interconnecting network is made up of 32 independent fabric planes. A fabric plane can be comprised of one fabric element or of a number of fabric elements. In one implementation a fabric element has 64 or 32 independent inputs and 64 or 32 independent outputs.

Figure 4:
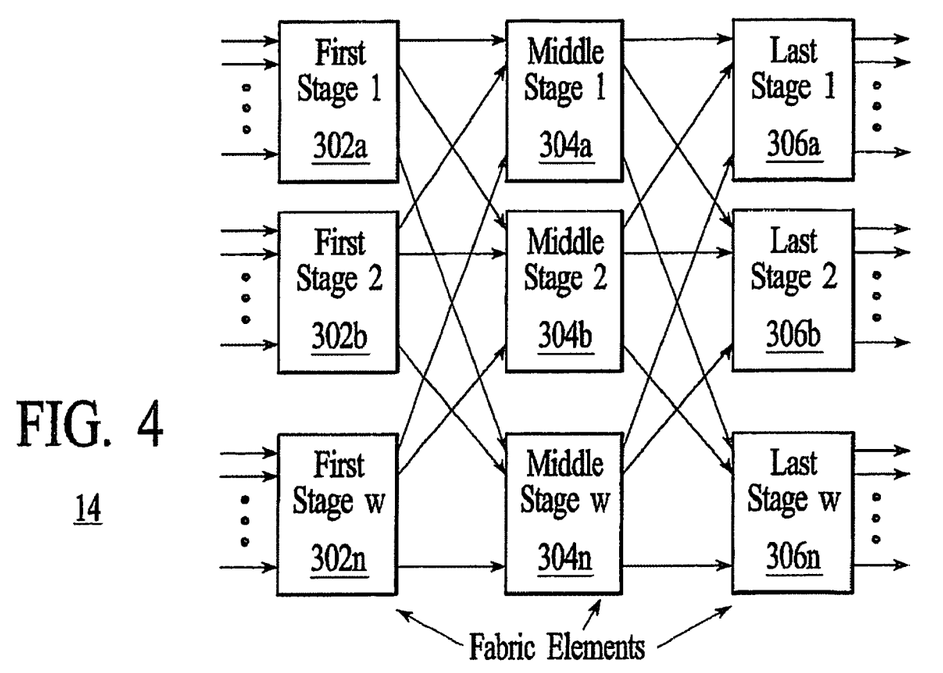
FIG. 4 is a block diagram of a multistage fabric.

FIG. 4 is a block diagram of a multistage fabric. Referring to FIG. 4, each plane of the interconnect network can be recursively built using a multi-stage network. An example of a known multistage network is shown where each fabric element 302a-302n of the first stage is connected to all elements 304a-304n of the second stage, and each element of the second stage is connected to each element 306a-306n of the third stage.

Figure 4A:
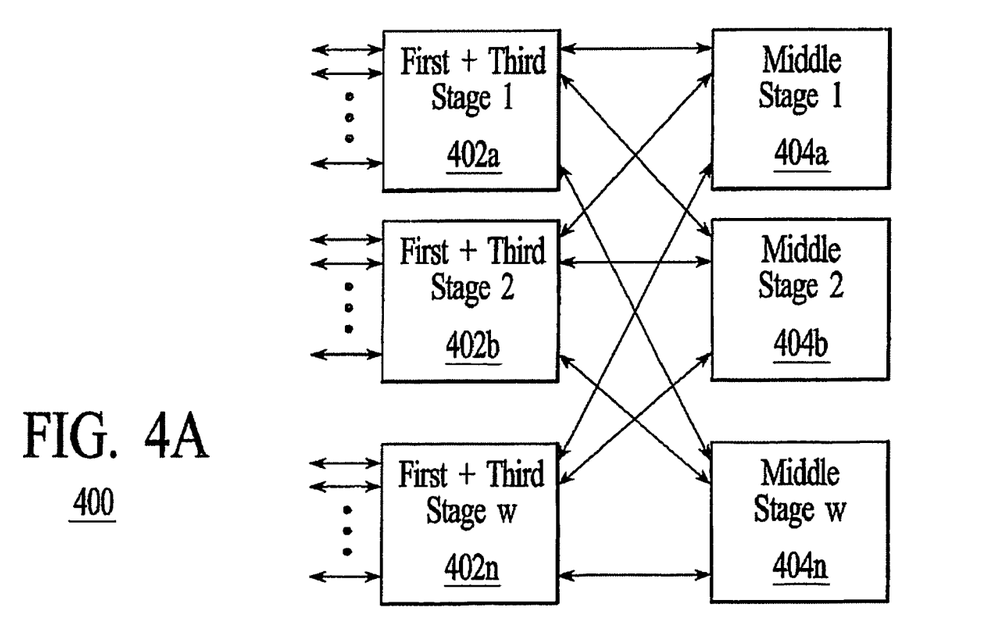
FIG. 4a is a block diagram of a multistage fabric plane implemented with a number of fabric elements.

FIG. 4a is a block diagram of a multistage fabric plane implemented with a number of fabric elements. Referring to FIG. 4a, the multi-stage fabric plane of FIG. 4 can be physically constructed out of fabric elements partitioned as shown. The first and third stage fabric elements are implemented in one fabric element device 402a-402n and the second stage fabric element in another fabric element device 404a-404n. Thus, FIG. 4a is a folded view of FIG. 4 along the center.

Figure 5:
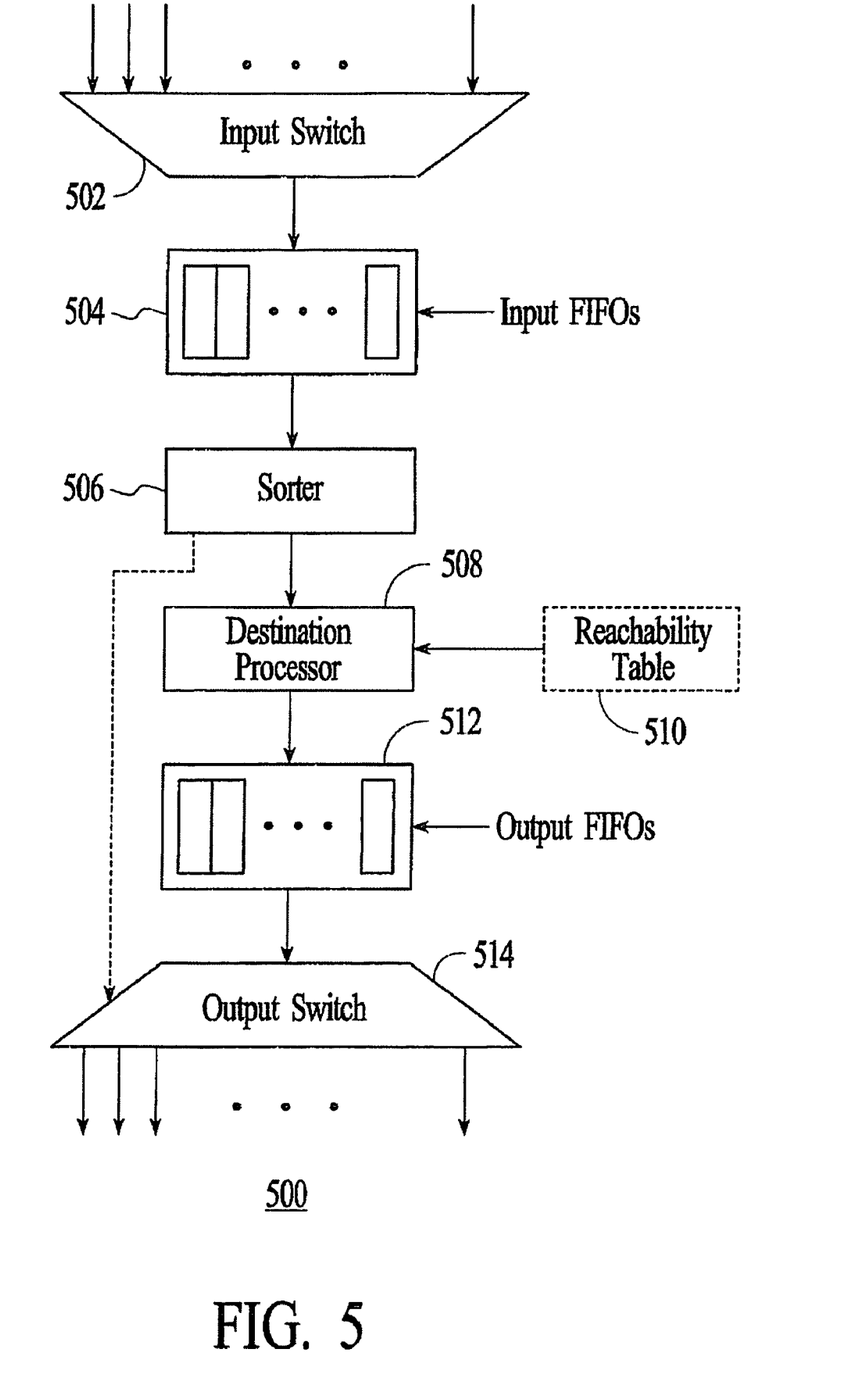
FIG. 5 is a block diagram of a fabric element.

FIG. 5 is a block diagram of a fabric element 500. Referring to FIG. 5, the fabric element has a number of input interfaces through which it receives cells from the previous stage and a number of output interfaces through which it sends cells to the next stage.

The fabric element of size n×n has an input switch 502, n input FIFOs 504, sorter 506, destination processor 508, n output FIFOs 512, and output switch 514. Data cells arriving from the inputs through the input switch 502 are placed in the link's respective FIFO 504 if they contain a packet fragment or if the FIFO occupancy is below a threshold and they are empty cells. The cell sorter 506 reads the oldest cell from each input FIFO and sorts the cells in order. Cell order is defined such that a cell ahead of another has: lagging time stamp, or if the timestamp is the same, has a source-id which has a predetermined priority (such as lower numerical value), or if both the timestamp and the source are the same has a lower fragment-number. When all incoming active link FIFOs have at least one cell (sorter has one cell from each FIFO) the sorter 506 removes the highest sorted cell. The sorter 506 forwards that cell to the destination processor 508 if the cell has a data fragment. The sorter 506 remembers the timestamp, source-id, and fragment-number of the last removed cell.

The destination processor 508 examines the destination of the cell and selects one of the possible links through which the cell's destination is reachable while maintaining load balance over all possible links. It then places the cell in the selected output FIFO 512. Cells are sent from the output FIFOs 512 to the output links through the output switch 514. One implementation has a reachability lookup table 510 where a cell's destination is looked up to get the possible output links.

When no cells are available in an output link's FIFO then an empty data cell is sent with the timestamp, source-id, and fragment-number of the last cell that was removed from the sorter. Cells sent from the Fabric Element are always ordered on any one link. Cell order is defined such that a cell ahead of another either has a lagging timestamp, or if the timestamp is the same, has a source-id which has a predetermined priority, or if both the timestamp and the source-ids are the same, has a lagging fragment-number.

Figure 6:
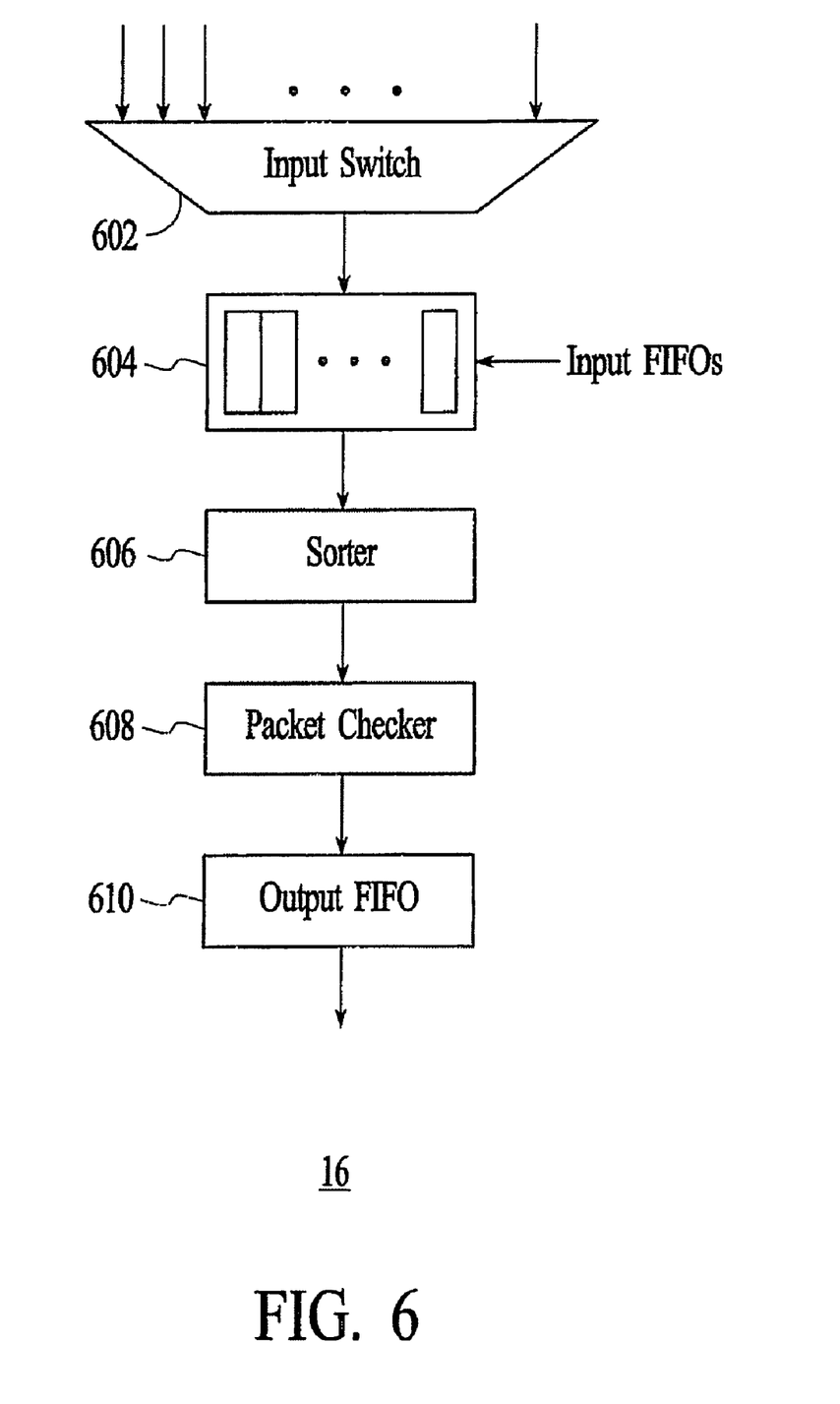
FIG. 6 is a block diagram of an egress controller.

FIG. 6 is a block diagram of an egress controller 16. Referring to FIG. 6, an egress controller with n inputs has an input switch 602, n input FIFOs 604, sorter 606, a packet checker 608, and an output FIFO 610. Cells arriving from the inputs through the input switch are placed in their respective FIFO 604 if they are full or if the respective input FIFO is below a threshold and they are empty cells. The cell sorter 606 reads the oldest cell of each input FIFO and sorts the cells in order. Cell order is defined such that a cell ahead of another either: has: lagging a time stamp, or if the timestamp is the same, has a source-id which has a predetermined priority, or if both the timestamp and the source are the same, has a lagging fragment-number. When all incoming active links' FIFOs have at least one cell the sorter removes the top cell. If the cell contains a packet fragment then it is forwarded to the packet checker. The packet checker verifies that the cell is the expected one in the packet sequence and if so places it in the output FIFO. If the checker detects an incomplete packet that packet is deleted from the output FIFO.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of switching, via a plurality of links of an interconnect network, a plurality of packets, which are received by a plurality of ingress controllers, to a plurality of output ports of a plurality of egress controllers, the method comprising:

segmenting said plurality of packets into a plurality of packet fragments;

generating a plurality of cells, each including one of said packet fragments, a global time stamp, an ingress identification, a destination identification, and a fragment number; and sending said plurality of cells to said plurality of output ports via said links based on a prioritization scheme which is based on said global time stamp, said ingress identification, and said fragment number, wherein sending said plurality of cells based on said prioritization scheme comprises:

prioritizing a first cell over a second cell having a lagging time stamp compared to a time stamp of said first cell;

prioritizing said first cell over a third cell having the same time stamp as said first cell and an ingress identification of lower priority compared to an ingress identification of said first cell; and prioritizing said first cell over a fourth cell having the same time stamp and ingress identification as said first cell and having a lagging fragment number compared to a fragment number of said first cell.

2. The method of claim 1 comprising transferring an empty cell from an ingress controller to a link if said ingress controller has no cell including a packet fragment to transfer to said link, said empty cell including at least a global time stamp corresponding to a global time at which said empty cell is transferred to said link, and an ingress identification corresponding to an identification of said ingress controller.

3. The method of claim 1 comprising transferring an empty cell from a fabric element of said network to a link if said fabric element has no cell including a packet fragment to transfer to said link, said empty cell including at least a global time stamp, an ingress identification and a fragment number of a cell previously received by said fabric element.

4. The method of claim 1 comprising transferring a cell from a fabric element of said network only after receiving cells from all input links of said fabric element.

5. The method of claim 4 comprising storing cells received from one or more of said input links according to a first-in-first out scheme.

6. The method of claim 1 comprising transferring a cell to an output port of an egress controller only after receiving cells from all input links of said egress controller.

7. The method of claim 6 comprising storing cells received from one or more of said input links according to a first-in-first out scheme.

8. The method of claim 1 comprising synchronizing, within a predetermined tolerance, the generation of time stamps by said plurality of ingress controllers.

9. The method of claim 1, wherein all cells corresponding to a certain packet have a time stamp corresponding to a global time at which a first cell of said certain packet is transferred to said network.

10. The method of claim 1, wherein at least one cell of said cells includes a flag indicating whether said cell is an empty cell.

11. The method of claim 1, wherein segmenting said plurality of packets comprises segmenting said plurality of packets into a plurality of fixed size fragments.

12. The method of claim 1, comprising maintaining reachability data to determine one or more possible links for reaching a destination port.

13. A system for switching a plurality of packets to a plurality of destinations via links of a network, the system comprising:

a plurality of ingress controllers to receive said plurality of packets, to segment said plurality of packets into a plurality of packet fragments, and to generate a plurality of cells each including one of said packet fragments, a global time stamp, an ingress identification, a destination identification, and a fragment number;

a plurality of egress controllers including a plurality of output ports; and an interconnect network including a plurality of fabric elements to transfer said cells from said ingress controllers to said egress controllers via a plurality of links, wherein said cells are sent to said plurality of output ports via said links based on a prioritization scheme which is based on said global time stamp, said ingress identification, and said fragment number, and wherein at least one of said egress controllers and said plurality of fabric elements is able to:

prioritize a first cell over a second cell having a lagging time stamp compared to a time stamp of said first cell;

prioritize said first cell over a third cell having the same time stamp as said first cell and an ingress identification of lower priority compared to an ingress identification of said first cell; and prioritize said first cell over a fourth cell having the same time stamp and ingress identification as said first cell and having a lagging fragment number compared to a fragment number of said first cell.

14. The system of claim 13, wherein at least one fabric element is able to transfer an empty cell to a link if said fabric element has no cell including a packet fragment to transfer to said link, said empty cell including at least a global time stamp, an ingress identification and a fragment number of a cell previously received by said fabric element.

15. The system of claim 13, wherein at least one fabric element is able to transfer a cell only after receiving cells from all input links of said fabric element.

16. The system of claim 15, wherein said fabric element comprises a first-in-first-out storage scheme to store cells received from one or more of said input links.

17. The system of claim 13, wherein at least one egress controller is able to transfer a cell to an output port of said egress controller only after receiving cells from all input links of said egress controller.

18. The system of claim 17, wherein said egress controller comprises a first-in-first-out storage scheme to store cells received from one or more of said input links.

19. The system of claim 13, wherein at least one ingress controller is able to transfer an empty cell to a link if said ingress controller has no cell including a packet fragment to transfer to said link, said empty cell including at least a global time stamp corresponding to a global time at which said empty cell is transferred to said link, and an ingress identification corresponding to an identification of said ingress controller.

20. The system of claim 13 comprising a global clock scheme to synchronize, within a predetermined tolerance, the generation of time stamps by said plurality of ingress controllers.

21. The system of claim 13, wherein at least one ingress controller is able to generate all cells corresponding to a certain packet having a time stamp corresponding to a global time at which a first cell of said certain packet is transferred to said network.

22. The system of claim 13, wherein at least one ingress controller is able to generate at least one cell including a flag indicating whether said cell is an empty cell.

23. The system of claim 13, wherein said plurality of ingress controllers are able to segment said plurality of packets into a plurality of fixed size fragments.

24. The system of claim 13 comprising at least one reachability table to maintain reachability data to determine one or more possible links for reaching a destination port.

* * * * *